Patented Mar. 6, 1928.

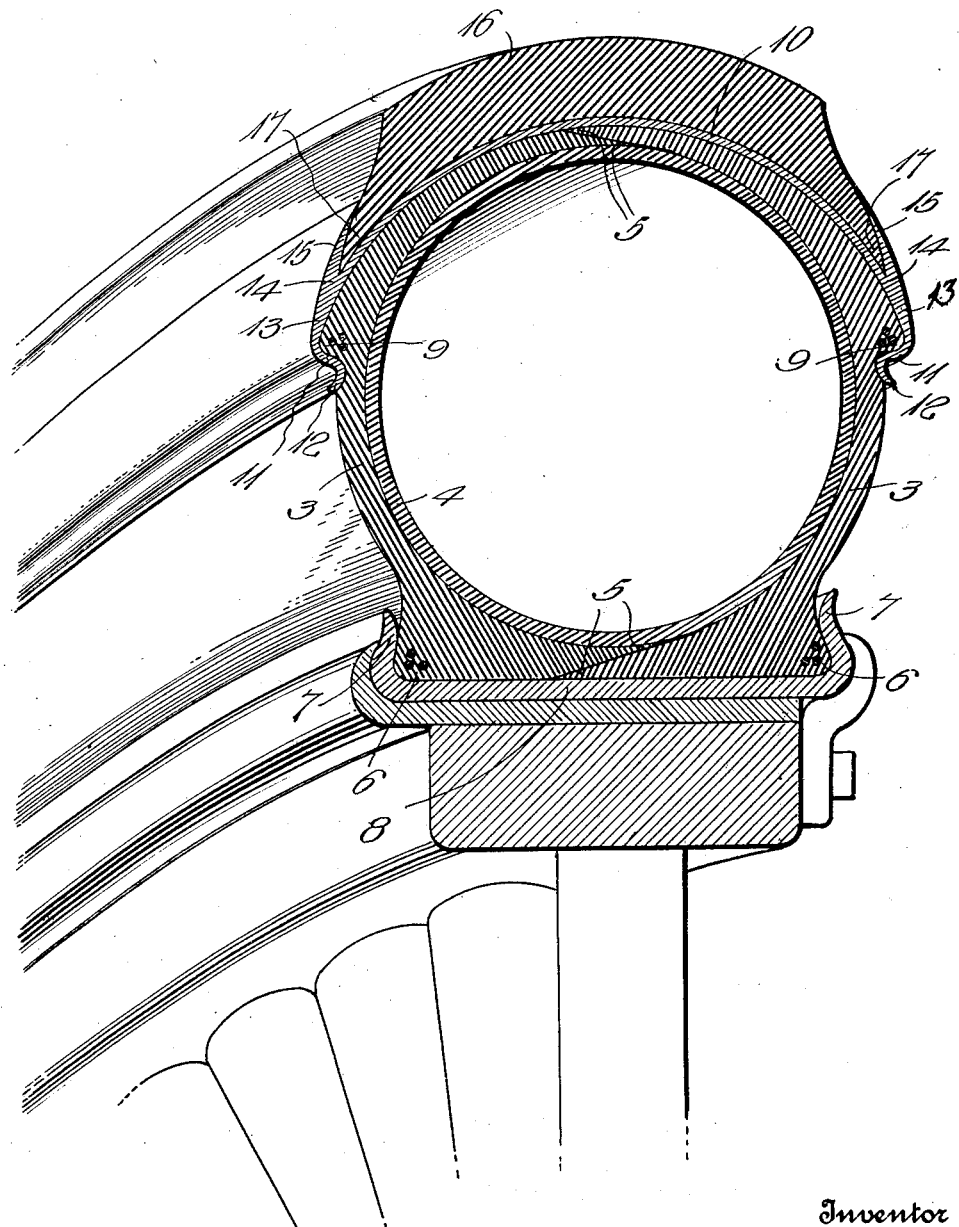

1,661,978

UNITED STATES PATENT OFFICE.

RAYMOND J. TALBOTT, OF TULSA, OKLAHOMA.

ARMORED PNEUMATIC TIRE.

Application filed September 16, 1926. Serial No. 135,903.

The invention relates, in the embodiment herein illustrated, to pneumatic tires of a type in which the tube-containing chamber is formed from two opposed annular side members beaded to engage the usual rim and additionally beaded near the tread portion of the tire, these additional beads being engaged by hook-like flanges along the edge portions of a tread-carrying band which holds the peripheral portions of the side walls against separation and co-acts with said side walls in forming the complete tube casing.

The tread carried by the band is formed separately therefrom and of yieldable material, whereas said band is formed from metal, and it is one object of the invention to provide novel means whereby, upon inflation of the tire, the edge portions of the tread ring will be tightly gripped and held against the band in such a manner as to prevent slippage of the latter, as well as to exclude dust, sand, mud, etc.

It is another object of the invention to provide a tire construction of the type set forth, which will be rather simple and inexpensive, yet will be efficient and in every way desirable, the construction being such as to be proof against puncture or blow-out, and such that in case of wearing out or injury to any one part, it is only necessary to replace this part rather than the entire structure.

With the foregoing in view, the invention resides in the novel subject matter hereinafter described and claimed, the description being supplemented by the accompanying drawing which shows a sectional perspective view of the tire applied to a rim and wheel.

In the drawing above briefly described, illustrating the preferred form of construction, the numerals 3 designate two opposed annular side walls which are so curved in transverse section as to cooperate in forming a complete chamber for the usual inner tube 4, the cross section of said chamber being preferably circular as shown in Fig. 1. The side walls 3 are formed from rubber with suitable fabric or cord carcass, and the inner and outer edge portions of said walls are tapered and brought to feather edges as indicated at 5, so that they may smoothly overlap. These tapered edge portions are flexible and the edge portions of either wall may be lapped against either the inner or the outer side of the corresponding portions of the outer wall, the two walls being exact duplicates for ease in manufacture and assembly, insuring also that if one new side wall is purchased for a tire, said wall will fit either side of such tire.

At the rim side of the tire, the walls 3 are provided with beads 6 of conventional form to engage the usual flanges 7 of a rim 8 of the type now commonly use. Obviously, the beads may be made to engage either clincher rims or straight side rims, and these beads may be reinforced in any desired manner.

Near the tread portion of the tire, the side walls 3 are formed with additional external beads 9 which are suitably reinforced. The aforesaid tread portion of the tire is covered by a transversely curved, tread-carrying band 10 which is formed of metal, said band being of a width to not only cover the actual tread portion of the tire, but to extend inwardly across the outer peripheral portions of the opposed sides of such tire. The edges of this band 10 are curved first inwardly as at 11 and then outwardly at 12, providing continuous hook-like formations which engage the beads 9, and it will be seen that during operation of the tire, the outwardly turned portions 12 act similarly to the flanges of a straight side rim to prevent injurious chafing of the elastic tire body.

The band 10 is provided with integral marginal portions 13 which, upon inflation of the tire, are adapted to spring outwardly with respect to the remainder or body portion of said band, such springing taking place at 14 on the drawing. Integrally joined to these marginal portions 13, substantially at their juncture with the remainder or body portion of the band 10, are two flanges 15 which extend circumferentially and are disposed in outwardly spaced relation with said remainder or body portion of the band, the flanges and band being preferably in acute angular relation with each other. When the marginal portions 13 spring outwardly under inflation of the tire, the flanges 15 joined to said marginal portions, are forced inwardly toward the aforesaid remainder or body portion of the band, for a purpose to appear.

A suitable tread ring 16 surrounds the band 10 and is preferably formed of rubber reinforced with fabric or cords or in other desired ways. This ring may if desired be cemented or vulcanized to the band, but this is not absolutely essential, as the edge portions 17 of said ring are tightly held between the flanges 15 and the opposed portions of the band. When the marginal portions 13 are outwardly forced by inflation of the tire and the flanges 15 are consequently pried inwardly, they so co-operate with the opposed portions of the band 10 as to tenaciously grip or clamp the edge portions 17 of the tread ring 16. Thus, this ring is tightly held upon the band 10 and water, sand, dust, mud, etc. are effectively prevented from finding their way between the tread ring and band.

Whenever the tread ring 16 is worn out, it may be quickly and easily replaced with a new one at small expense. Similar replacements may be made with respect to the band 10 and the side walls 3, and particular attention is invited to the fact that whenever any one part of the tire has become worn out or badly injured, such part may be replaced with a new part, without the necessity of buying an entirely new tire.

It will be seen from the foregoing that a construction has been provided which is exceptionally simple and inexpensive, yet will be efficient, reliable and in every way desirable. In addition to considering the advantages of the sectional construction of the tire, attention is also invited to its puncture-proof qualities and to the fact that it is proof against blow-outs under ordinary usage, as even the exposed portions of the side walls 3 are to a large extent protected against snubbing against curbs, the sides of ruts, etc., by the marginal portions 13 of the band 10, which portions and their hook-like formations 11—12, project laterally beyond said exposed portions of the side walls.

On account of the excellent results obtainable from the details disclosed, they are preferably followed. However, within the scope of the invention as claimed, variations may of course be made.

If found advisable, the flanges 15 may be transversely cut at intervals to facilitate their inward movement toward the body portion of the band 10.

I claim:—

A pneumatic tire comprising two duplicate side walls of flexible material transversely curved to jointly form a tube chamber of substantially circular cross section, said walls having feather edges which overlap at both the rim side and the tread side of the tire, said walls being provided with beads at the rim side of the tire for engagement with the flanges of the usual rim and being provided also with external beads between the tread side and rim side of the tire, a transversely curved tread-carrying band around the tread portion of the tire having its edges curved first inwardly and then outwardly to provide rounded hooks, said hooks tenaciously engaging the last named beads but being removable therefrom when the tire is deflated, and a pair of outwardly flaring flanges joined to the outer sides of said band in outwardly spaced relation to said hooks, whereby upon outward springing of the hooked edges of the band said flanges are forced inwardly toward the adjacent body portion of the band and a renewable tread ring surrounding the remaining body portion of the band and having its edge portions disposed between the same and said flanges to be tightly gripped when the flanges move inwardly upon the inflation of the tire.

In testimony whereof I have hereunto affixed my signature.

RAYMOND J. TALBOTT.